(12) United States Patent
Rackett

(10) Patent No.: US 6,317,522 B1
(45) Date of Patent: Nov. 13, 2001

(54) SYSTEMS AND METHODS FOR POST-PROCESSING DECOMPRESSED IMAGES

(75) Inventor: Albert E. Rackett, Milpitas, CA (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/204,178

(22) Filed: Dec. 3, 1998

(51) Int. Cl.$^7$ .................................................. G06T 9/00
(52) U.S. Cl. .................................... 382/268; 382/275
(58) Field of Search .................................. 382/268, 275, 382/166, 232–236, 309; 358/433, 261.1–261.3

(56) References Cited

U.S. PATENT DOCUMENTS

| | | | |
|---|---|---|---|
| 4,805,121 | * 2/1989 | Scott et al. | 364/522 |
| 4,807,033 | * 2/1989 | Keesen et al. | 358/167 |
| 5,170,264 | 12/1992 | Saito et al. | 358/433 |
| 5,367,385 | 11/1994 | Yuna | 358/465 |
| 5,555,028 | 9/1996 | Kim | 348/607 |
| 5,629,778 | * 5/1997 | Rueman | 358/426 |
| 6,192,148 | * 2/2001 | Lin | 382/166 |

FOREIGN PATENT DOCUMENTS

| | | | |
|---|---|---|---|
| 0801506A2 | 10/1997 | (EP) | H04N/7/30 |
| WO-00/33254 | * 6/2000 | (WO) | G06T/9/00 |

OTHER PUBLICATIONS

Byeungwoo Jeon and Jechang Jeong, "Blocking Aritfcts Reduction in Image Compression With Block Boundary Discontinuity Criterion", IEEE Transactions on Circuits and Systems for Video Tech., U. IEEE, Inc. New York, vol. 8, No. 3, Jun. 1, 1998, pp. 345–357.

* cited by examiner

*Primary Examiner*—Thomas D. Lee
*Assistant Examiner*—Stephen Brinich
(74) *Attorney, Agent, or Firm*—Russell Gross

(57) ABSTRACT

This invention relates to a system and method for reducing blocking artifacts introduced by current compression algorithms that compress images as independent blocks of pixels. Preferably, the methods of the invention include determining block-to-block differences in edge pixels or in overall intensities between adjacent pixel blocks, selecting pixel blocks for post-processing that appear to be in relatively featureless regions of the image, interpolating the block-to-block edge differences into a error correction matrix, and then subtracting the error correction matrix from the original pixel block. These methods are preferably implemented in special software routines that execute on micro-processor based systems or on digital signal processor based systems optimized for image decoding.

20 Claims, 6 Drawing Sheets

SYSTEMS AND METHODS FOR POST-PROCESSING DECOMPRESSED IMAGES

BACKGROUND OF THE INVENTION

1. Field of the Invention

The present invention relates to systems and methods for post-processing decompressed images in order to minimize perceptual artifacts due to prior image compression, and in particular to such prior image compression methods that process images as independent blocks of pixels.

2. Description of the Related Art

Many important image compression methods process images as independent blocks of pixels. For example, such families of compression standards as JPEG, MPEG, H.320, and so forth, specify a step involving discrete cosine transformation ("DCT") of independent, non-overlapping 8×8 blocks of pixels in the source image followed by quantization of the resulting transform coefficients. See, e.g., Jack, 1996, *Video Demystified*, HighText Interactive Inc., San Diego, Calif. The quantized transform coefficients are transmitted from a transmitter-encoder to a receiver-decoder. Such transformation and quantization together achieve compression by exploiting the significant correlations that typically occur between the values of pixels in 8×8 blocks, but result in loss of image information ("lossy" compression), the coarser the quantization the greater the loss.

Decompressing images so compressed, which necessarily involves steps of dequantization and inverse DCT of the received quantized coefficients in order to derive a received decompressed image, can lead to what are called herein "blocking artifacts" in the following manner. In certain areas of a received image, the quantization errors introduced can become especially apparent and even objectionable. Especially, in regions where the image is fairly smooth, with little high spatial frequencies components, errors in the low spatial frequency components can make the individual, independent 8×8 blocks perceptually apparent. This is especially so if low frequency components, which smoothed the block-to-block boundaries in the source image, are set to zero.

Several methods of reducing such blocking artifacts are available in the current state of the art. Simple lowpass filtering applied to the decompressed image can blur blocking artifacts and reduce their prominence to some extent, but it necessarily leads also to an overall degraded sharpness in the image. Blocks can be overlapped in the source image in order to redundantly encode block-to-block boundaries, but at the cost of decreased compression and increased required communication bandwidth.

Further, Pennebaker et al., 1993, *JPEG Still Image Compression*, Van Nostrand Reinhard, chap. 16, discloses JPEG block smoothing by fitting quadratic surfaces to the average values of pixels (equivalent to the "DC", or lowest order, transform coefficient) in adjacent blocks, a computationally complex process. Lakhani, 1996, "Improved Image Reproduction from DC Components", Opt. Eng. 35:3449–2452, discloses equations for predicting low frequency transform coefficients from DC coefficients that are improved from those in the JPEG standard. Finally, Jeon et al., 1995, Blocking Artifacts Reduction in Image Coding Based on Minimum Block Boundary Discontinuity, Proc SPIE 2501:189–209, discloses a complex and computationally expensive iterative method for zeroing block boundary discontinuities.

Importantly, all current art methods appear to achieve blocking artifact reduction by in one fashion or another performing versions of spatial low-pass filtering. These current art methods also all suffer from one or more additional problems, such as producing overall image degradation, limiting image compression, failing to explicitly address the perceptual aspects of blocking artifacts, requiring excessive computational resources, and so forth.

What is needed, therefore, is a method and system for post-processing decompressed images which is computationally efficient, avoids spatial low-pass filtering, does not produce image degradation, has no effect on compression, and, most importantly, minimizes the perceptual aspects of blocking artifacts.

Citation of a reference herein, or throughout this specification, is not to be construed as an admission that such reference is prior art to the Applicant's invention of the invention subsequently claimed.

SUMMARY OF THE INVENTION

The objects of the present invention are to provide systems and methods for post-processing decompressed images in order to minimize blocking artifacts and which overcome the above identified problems in the current art.

Fundamentally, these objects are achieved by methods which achieve blocking artifact reduction by correcting the surface defined by the pixel values in a block of pixels with "bending", "tilting", or "twisting" deformations in order to more closely match pixel-value surfaces of adjoining pixel blocks. Since low-pass filtering is avoided by such surface deformations, the corrections added to the pixel values by the methods of this invention more closely match the actual errors and artifacts introduced by the image blocking process.

In detail, these objects are achieved by determining an 8×8 matrix of correction values for each processed 8×8 pixel block in an image. The correction matrices are then added to the pixel blocks in order to derive post-processed pixel blocks with minimized blocking artifacts. The resulting pixel values of the corrected pixel blocks blend with pixel values of adjacent blocks, also typically corrected, in a perceptually smooth manner with minimum block-to-block artifacts. The correction matrices are derived from differences between values of pixels along the edges of a block to be post-processed and pixels along the edges of the four orthogonally adjacent pixel blocks. Alternatively, the correction matrix is derived from zero-frequency ("DC") transform coefficients of a pixel block to be post-processed and the four adjacent pixel blocks.

The 8×8 matrix of correction values is either derived directly according to a preferred entirely spatial-domain interpolation, or derived indirectly by an alternative computation from a smaller 4×4 spatial-domain intermediary error correction matrix. Direct and inverse transforms of the intermediary correction matrix to and back from a frequency domain accomplish smooth interpolation of the smaller intermediary matrix to an 8×8 matrix of correction values. Preferably, decoded blocks are selected for post-processing principally in relatively flat or featureless image regions. Such image regions are most likely to have perceptually apparent blocking artifacts.

In detail, these objects are achieved by the following embodiments of this invention. In a first embodiment, the present invention includes a method for post-processing a decompressed image, the image having been compressed by a process including independent compression of non-overlapping rectangular blocks of pixels covering the original image, the method comprising: determining four or more quantities for each pixel block in the decompressed image that are representative of blocking artifacts, wherein the four or more quantities for a pixel block are determined from block-to-block differences between combinations of values of pixels in that pixel block and combinations of values of pixels in the four pixel blocks orthogonally adjacent to that pixel block, selecting pixel blocks for post-processing according to the four or more quantities for each pixel block and a threshold value, determining an error correction matrix for each selected pixel block from the four or more quantities for that selected pixel block, wherein the error correction matrices have the same size as the pixel blocks, and adding the error correction matrices to the selected pixel blocks to derive post-processed pixel blocks and the post-processed image.

In a first aspect of the first embodiment, the four or more quantities for a pixel block are four quantities determined from the four differences between averages of values of pixels along each edge of that pixel block and averages of values of pixels along adjacent edges of the adjacent pixel blocks.

In a second aspect of the first embodiment, the four or more quantities for a pixel block are determined from averages of differences between the values of pixels of each of two or more adjacent pairs of pixels, and for each pair of pixels one pixel of that pair is at an edge of that pixel block and the other pixel of that pair is adjacent at an adjacent edge of the adjacent pixel block.

In a third aspect of the first embodiment, compression of a pixel block comprises quantizing transform coefficients of the values of pixel of that pixel block. Additionally in this aspect the four or more quantities for a pixel block are four quantities determined from the four differences between a zero-frequency (DC) transform coefficient of that pixel block and zero-frequency transform coefficients of the four orthogonally adjacent pixel blocks. Additionally in this aspect the threshold value is of the order of magnitude of errors in pixel values introduced by the combined steps of transforming, quantizing, dequantizing, and inverse transforming applied to pixel blocks.

In a fourth aspect of the first embodiment, each error correction matrix is determined by a process comprising linearly interpolating the four or more quantities according to selected spatial configuration weights in order to determine elements of the error correction matrices.

Additionally in this aspect, the linear interpolation is performed in a dimensionally-independent manner according to which a quantity at an edge is interpolated similarly to all error correction matrix elements that are in a direction perpendicular to that edge. Additionally in this aspect, the spatial configuration weights are selected such that (i) the largest weight is applied at the edge associated with the quantity to be interpolated, (ii) the sum of the spatial configuration weights is zero, and (iii) the interpolation of equal quantities of opposite sign at two opposite edges result in a linear gradient of error correction matrix elements between the two opposite edges.

In a fifth aspect of the first embodiment, determining an error correction matrix comprises: determining an intermediary error correction matrix having a size smaller than the size of the pixel blocks by linearly interpolating the four or more quantities in a dimensionally independent manner according to selected spatial configuration weights, transforming the intermediary error correction matrix to a transform domain, and inverse transforming the transformed intermediary error correction matrix to the error correction matrix, wherein for the inverse transformation selected higher order transform coefficients are set to zero. Additionally in this aspect, the pixel blocks are square of size 8×8 pixels, and the intermediary error correction matrices are square of size 4×4 pixels.

In a sixth aspect of the first embodiment, the error correction matrix is determined so that block-to-block pixel differences between two adjacent post-processed pixel blocks are smaller than but of the same sign as the block-to-block pixel differences between those two adjacent pixel blocks prior to post-processing.

In a second embodiment, the present invention includes a computer readable media encoded with program instructions for causing one or more processors to perform the methods and the aspects of the methods of the first embodiment.

In a third embodiment, the present invention includes a system for post-processing a decompressed image, the image having been compressed by a process including independent compression of non-overlapping rectangular blocks of pixels covering the original image, the system comprising: means for determining four or more quantities for each pixel block in the decompressed image that are representative of blocking artifacts, wherein the four or more quantities for a pixel block are determined from block-to-block differences between combinations of values of pixels in that pixel block and combinations of values of pixels in the four pixel blocks orthogonally adjacent to that pixel block, means for selecting pixel blocks for post-processing according to the four or more quantities for each pixel block and a threshold value, means for determining an error correction matrix for each selected pixel block from the four or more quantities for that selected pixel block, wherein the error correction matrices have the same size as the pixel blocks, and means for adding the error correction matrices to the selected pixel blocks to derive post-processed pixel blocks and the post-processed image.

In a fourth embodiment, the present invention includes a system for post-processing a decompressed image, the image having been compressed by a process including independent compression of non-overlapping rectangular blocks of pixels covering the original image, the system comprising: one or more processors for executing program instructions, and one or more memory units for storing an image to be processed and program instructions, wherein the program instructions cause the one or more processors to determine four or more quantities for each pixel block in the decompressed image that are representative of blocking artifacts, wherein the four or more quantities for a pixel block are determined from block-to-block differences between combinations of values of pixels in that pixel block and combinations of values of pixels in the four pixel blocks orthogonally adjacent to that pixel block, to select pixel blocks for post-processing according to the four or more quantities for each pixel block and a threshold value, to determine an error correction matrix for each selected pixel block from the four or more quantities for that selected pixel block, wherein the error correction matrices have the same size as the pixel blocks, and to-add the error correction matrices to the selected pixel blocks to derive post-processed pixel blocks and the post-processed image.

BRIEF DESCRIPTION OF THE DRAWING

Other objects, features and advantages of the present invention will become apparent upon perusal of the following detailed description when taken in conjunction with the appended drawing, wherein.

DETAILED DESCRIPTION OF THE PREFERRED EMBODIMENTS

In the following, exemplary embodiments of systems of the present invention are first described followed by detailed descriptions of embodiments of the methods of the present invention. Finally, an example of applying an embodiment of the present invention to a test image with a maximum of blocking artifacts is presented.

Preferred Systems Embodiments

Figure 1A:
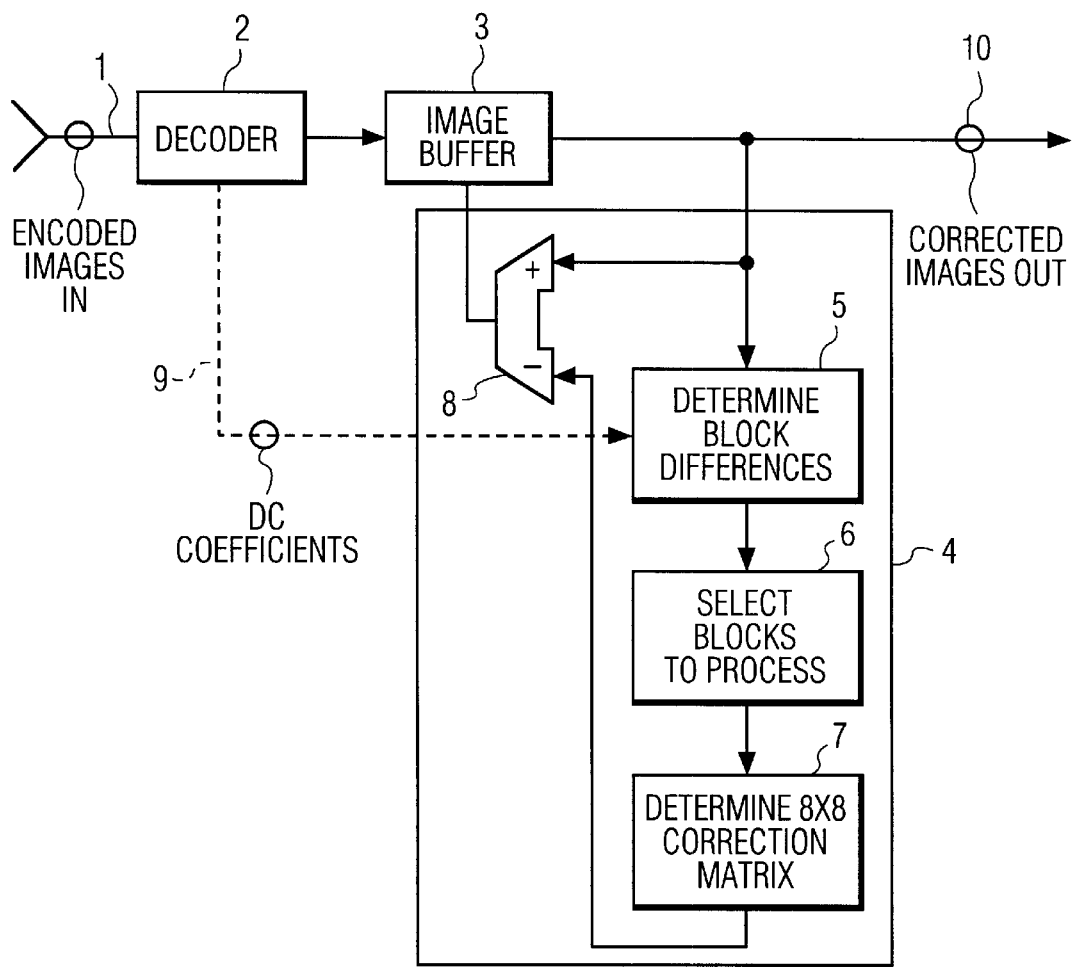
FIGS. 1A–B illustrate exemplary embodiments of systems of the present invention.

FIG. 1A generally illustrates an embodiment of a system according to the present invention, represented within box 4, in conjunction with a conventional image decoder system, including input 1, decoder 2, and image buffer 3.

The present invention is adaptable to decoded images that were encoded by any process that divides an original image into non-overlapping, rectangular blocks of pixels, and independently encodes each such rectangular block. In the following, the invention is described with respect to such conventional families of compression standards as JPEG, MPEG, and H.320, according to which an original image is divided into non-overlapping and independent 8×8 blocks of pixels, which are encoded as quantized DCT coefficients.

The invention is most effective when the images are highly compressed, and, accordingly, when quantization of the DCT coefficients is aggressive or coarse. Exemplary of such compression levels is compression to 0.25 or less bits of luminance information per pixel.

Encoded images are input at 1 to the conventional decoder system illustrated. Decoder 2 then performs conventional decoding of the input images according to the encoding method, and stores decoded images temporarily in image buffer 3. In the absence of the present invention, the images are directly output from the image buffer. The present invention adds the processing elements and steps represented within box 4 to such a conventional decoder.

The general processing operations performed by the present invention are next generally described with details following subsequently. In first processing operation 5, quantities representative of blocking artifacts in a decoded or decompressed image, are determined for all blocks from various aspects block-to-block pixel value differences. Preferably, four such representative quantities are determined for each pixel block. In second processing operation 6, the individual blocks to be post-processed by the present invention are selected heuristically in view of the determined block-to-block differences. In one embodiment, if any of these differences exceed a threshold value, the block is not processed; alternatively, if the differences exceed the threshold, their values are set down to that threshold. This step reflects the discovery of the inventor that large block-to-block differences are likely caused by structure actually present in the original image, while small block-to-block differences typically reflect blocking artifacts present in relatively featureless regions on the original image. These should be corrected. Finally, in third processing operation 7, for each post-processed 8×8 block, an 8×8 matrix of correction values is determined according to the alternative embodiments to be described subsequently. The correction values are determined to smoothly link the post-processed block to its orthogonally-adjacent blocks Processing of the blocks in the image buffer can be sequential or in parallel according to the available hardware.

Finally, the correction matrix and the original decoded block are added by adder 8 and stored back in image buffer 3. When all blocks in the image buffer have been processed, a corrected image with minimal blocking artifacts is output at 10.

Optionally, the DC coefficients (i.e., zero frequency coefficients) transmitted in the encoded images can be used in processing step 5 to determine the block-to-block differences. In this case, it is advantageous for the decoder to make these coefficients available over connection 9, which can include a coefficient buffer as needed.

Figure 1B:
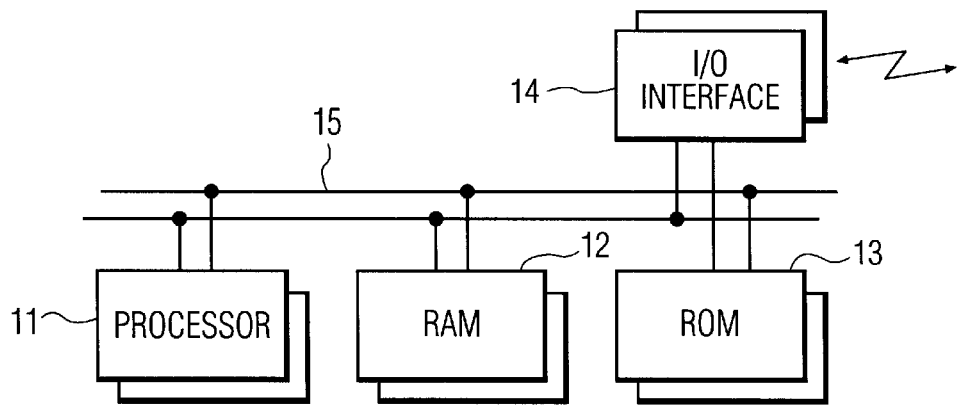

This system can be implemented in various hardware configurations that will be apparent to one of average skill. For example, the individual image processing operations represented in FIG. 1A can be implemented with individually dedicated hardware components. However, it is currently preferable that the processing operations of the system be implemented by one or more special software routines running on general purpose hardware, perhaps optimized for image decoding, such as that illustrated in FIG. 1B. FIG. 1B illustrates one or more processors 11 for decoding images and performing the operations of the present invention, one of more RAM modules 12 for storing image data and/or program instructions, optionally one or more ROM modules 13 for storing program instructions, one or more I/O interface devices 14 for communicating with other systems, and one or more busses 15 for connecting these individual components. Advantageously, the processors include one or more digital signal processors ("DSP"), such as the TM-1000 type DSP (Philips Electronics North America Corp.) or the TMS-3000 type DSP (Texas Instruments, Inc.).

In the preferred embodiment where the system processing operations are implemented in software, the present invention further comprises computer readable media on which are recorded or encoded program instructions for causing processors to perform the processing operation of the system. Such media can include magnetic media, such as floppy discs, hard discs, tapes, and so forth, optical media, such as CD-ROMS, and other media technologies usable in the art.

Preferred Method Embodiments

Preferred and alternative embodiments of processing operations 5–7 (FIG. 1A) are next described in detail. First, determination of block-to-block pixel differences, processing operation 5 (FIG. 3), which according to the present invention are taken to be representative of blocking artifacts, is described with reference to the candidate pixel blocks illustrated in FIGS. 2A–B. Although these figures and the subsequent discussion treats the common case of 8×8 pixel blocks, one of average skill will immediately appreciate how to modify the methods to be described in case rectangular pixel blocks of sizes other than 8×8 are used in a particular compression method.

Figures 2A, 2B:
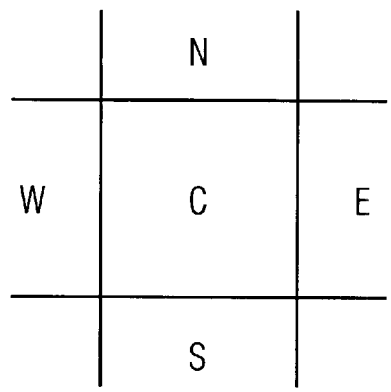
FIGS. 2A–B illustrate exemplary pixel blocks.

For candidate, central pixel block C in FIG. 2A, block-to-block pixel differences are determined with respect to the four, orthogonally-adjacent pixel blocks sharing edges with candidate, central block C. These blocks are labeled W (to the west of C), N (to the north of C), E (to the east of C), and S (to the south of C) in FIG. 2A. Diagonally adjacent pixel blocks are not directly considered. FIG. 2B illustrates pixel blocks C, N, E, W, and S in more detail in the case where the relevant image compression methods use 8×8 pixel blocks. Edge pixels for all these blocks are indicated in standard matrix notation. Also indicated are the DC coefficients (zero frequency coefficients) for these blocks ($C_{DC}$, $N_{DC}$, $E_{DC}$, $W_{DC}$, $S_{DC}$). It is well known that the DC coefficients are simply averages of the values of all the pixels in a block, and may be obtained directly from decoder 2 or may be computed as part of step 5.

With reference to FIG. 2B, a first method for determining block-to-block pixel differences computes the average differences between pixels along each edge of block C and pixels along adjacent edges of blocks N, E, W, and S. Four quantities are returned, each reflecting the block-to-block differences along an edge of central block C. This preferred method, directly and with minimum computation, returns values representative of pixel-value discontinuities at the boundaries of a pixel block. The following equations are representative of this method, where the four quantities N, E, W, and S are average edge-adjacent pixel differences along the north, east, west, and south edges of central block C, respectively.

$$N = 0.125 * FA * \{(N_{70} + N_{71} + N_{72} + N_{73} + N_{74} + N_{75} + N_{76} + N_{77}) -$$
$$(C_{00} + C_{01} + C_{02} + C_{03} + C_{04} + C_{05} + C_{06} + C_{07})\}$$
$$E = 0.125 * FA * \{(E_{00} + E_{10} + E_{20} + E_{30} + E_{40} + E_{50} + E_{60} + E_{70}) -$$
$$(C_{07} + C_{17} + C_{27} + C_{37} + C_{47} + C_{57} + C_{67} + C_{77})\}$$
$$W = 0.125 * FA * \{(W_{07} + W_{17} + W_{27} + W_{37} + W_{47} + W_{57} + W_{67} + W_{77}) -$$
$$(C_{00} + C_{10} + C_{20} + C_{30} + C_{40} + C_{50} + C_{60} + C_{70})\}$$
$$S = 0.125 * FA * \{(S_{00} + S_{01} + S_{02} + S_{03} + S_{04} + S_{05} + S_{06} + S_{07}) -$$
$$(C_{70} + C_{71} + C_{72} + C_{73} + C_{74} + C_{75} + C_{76} + C_{77})\}$$

Factor FA is a multiplicative weighting factor for scaling these edge differences. It is described subsequently in more detail in conjunction with second weighting factor FB.

A second alternative method for determining block-to block pixel differences employs DC coefficients, where available. This method returns four quantities representative of the differences in average intensity between central block C and its four orthogonally-adjacent surrounding blocks, N, E, W, and S. The following equations are representative of this method.

$$N = FA * \{N_{DC} - C_{DC}\}; \quad E = FA * \{E_{DC} - C_{DC}\}$$
$$W = FA * \{W_{DC} - C_{DC}\}; \quad S = FA * \{S_{DC} - C_{DC}\}$$

Finally, a third alternative method captures increased detail of block-to-block pixel differences along block edges by computing sub-edge differences. The methods above, which determine only four quantities, one for each edge of a central block, necessarily represent, therefore, only average differences along an entire edge. However, perceptual blocking artifacts can also reflect variations in block-to-block pixel differences along each edge, as well as simply block-to-block average differences. The third alternative method captures such variations in intensity by computing more than one quantity for each edge, each quantity representing the differences in one or more pairs of edge-adjacent pixels of central block C, instead of merely the average of all pixels along an edge. In a case where averages of the differences of two adjacent pairs of pixels are computed, the following equations are representative of the third alternative.

$$A = 0.250 * FA * \{(W_{17} - C_{10}) + (W_{07} - C_{00}) + (N_{70} - C_{00}) + (N_{71} - C_{01})\}$$

$$B = 0.500 * FA * \{(N_{72} - C_{02}) + (N_{73} - C_{03})\}$$

$$C = 0.500 * FA * \{(N_{74} - C_{04}) + (N_{75} - C_{05})\}$$

$$D = 0.250 * FA * \{(N_{76} - C_{06}) + (N_{77} - C_{07}) + (E_{00} - C_{07}) + (E_{01} - C_{17})\}$$

$$E = 0.500 * FA * \{(E_{20} - C_{27}) + (E_{30} - C_{37})\}$$

$$F = 0.500 * FA * \{(E_{40} - C_{47}) + (E_{50} - C_{57})\}$$

$$G = 0.250 * FA * \{(E_{60} - C_{67}) + (E_{70} - C_{77}) + (S_{07} - C_{77}) + (S_{06} - C_{76})\}$$

$$H = 0.500 * FA * \{(S_{05} - C_{75}) + (S_{04} - C_{74})\}$$

$$I = 0.500 * FA * \{(S_{03} - C_{73}) + (S_{02} - C_{72})\}$$

$$J = 0.250 * FA * \{(S_{01} - C_{71}) + (S_{00} - C_{70}) + (W_{77} - C_{70}) + (W_{67} - C_{60})\}$$

$$K = 0.500 * FA * \{(W_{57} - C_{50}) + (W_{47} - C_{40})\}$$

$$L = 0.500 * FA * \{(W_{37} - C_{30}) + (W_{27} - C_{20})\}$$

For illustrative purposes, quantities J, I, H, and G represent differences between pair of pixels in the outlined sub-blocks 16, 17, 18, and 19, respectively. Of course, a finer representation could be used, for example one in which a quantity is computed from the difference of each pair of edge-adjacent Pixels. Alternately, a coarser representation could be used by combining certain of the above quantities. For example, the following combined and coarser quantities can be used.

$$B' = C' = 0.500 * (B + C); \quad E' = F' = 0.500 * (E + F)$$
$$I' = H' = 0.500 * (I + H); \quad L' = K' = 0.500 * (L + K)$$

Other similar alternatives of increased or decreased coarseness will be apparent to one of skill in the art.

Figure 3:
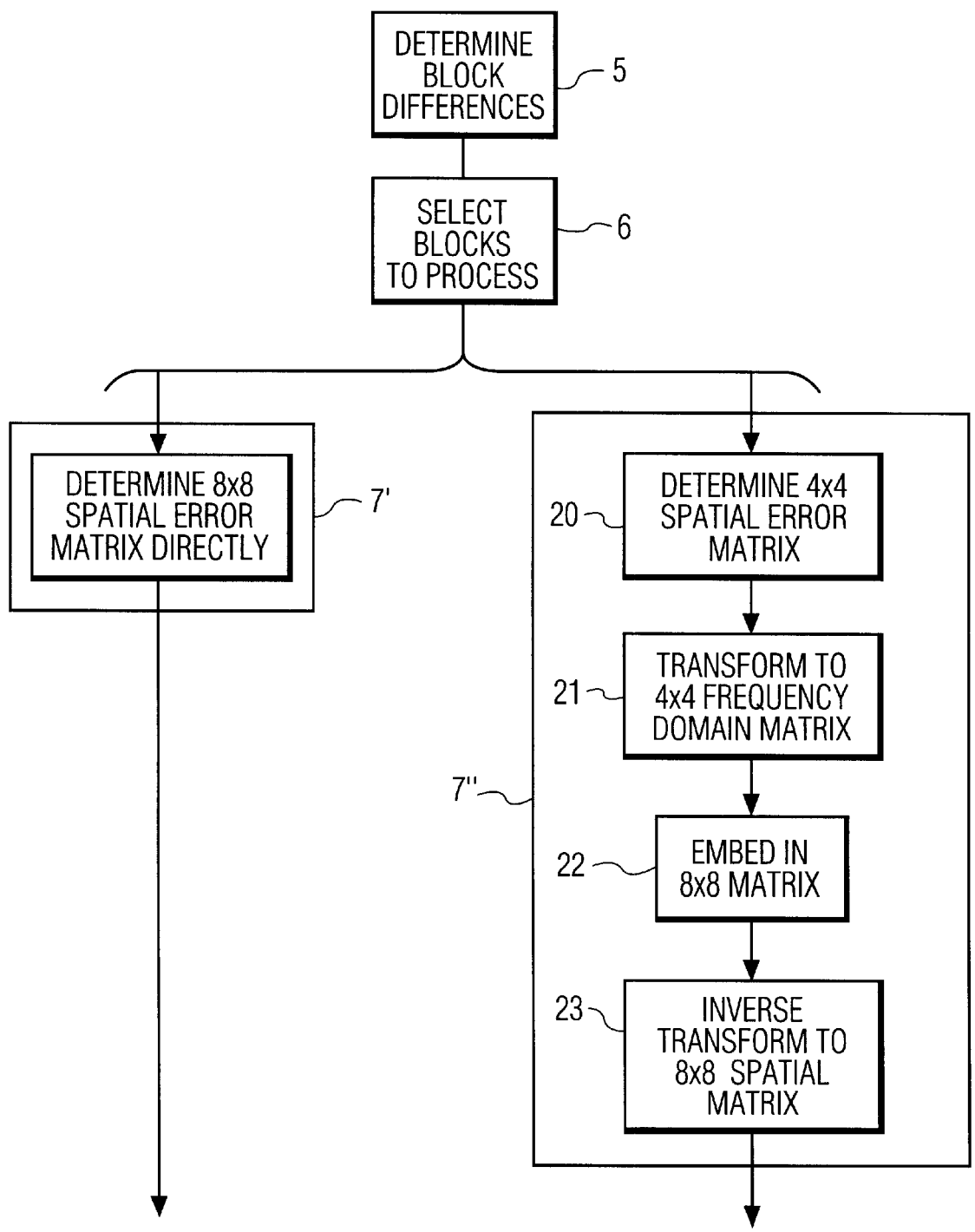
FIG. 3 illustrates exemplary embodiments of methods of the present invention.

Turning to the next processing operation, operation 6 of FIG. 3, blocks are selected for post-processing in view of heuristic block selection criteria that depend on the block-to-block pixel differences determined above. The overall goal and purpose of the system and method of the present invention is to achieve perceptually improved images, and not to post-process images merely to achieve certain mathematical effects or consistency without regard to perceptual changes. Accordingly, the methods of the present invention include heuristic block selection criteria, adjustable weighting factors for block-to-block pixel differences, and computational alternatives that can be adjusted or selected in particular cases to obtain maximum perceptual improvements, in general or with respect to image classes or interest, within the processing resources available.

In detail, block selection criteria are derived from the discovery of the inventor that in many cases block-to-block pixel differences represent image structures in a source image whose correction can result in perceptually objectionable image alterations. Such differences are likely to represent real image structure where the differences along one or more edges are particularly "large". In contrast, where block-to-block differences are "small", the actual image is likely to be relatively flat or featureless, i.e., devoid of particularly apparent structure. In such regions small blocking artifacts are most perceptually apparent, and, therefore, should be corrected according to the present invention. Additionally, "small" block-to-block pixel difference are also a likely indicator of differences due only to blocking artifacts. "Small" is advantageously measured in view of a particular image compression algorithm as that degree of block-to-block pixel differences which are of a magnitude likely to be due to quantization errors in the low frequency transform coefficients, in particular as that degree of block-to-block pixel differences resulting from zeroing of low frequency transform coefficients as a result of coarse quantization and subsequent dequantization. A "small" difference is taken to be of the magnitude of this quantization error, or in other words preferably approximately 2–4 times such quantization error. A "large" block-to-block pixel difference, on the other hand, is preferably 5 or more times such quantization error. Therefore, block with "small" block-to-block pixel differences are post-processed, while block with large differences are not.

In particular, for JPEG or MPEG, which use DCT transformation of 8×8 blocks, applied to pixels represented by 8 bits (values between 0 and 255), "small" is preferably a block-to-block difference of less than 5, and more preferably less than 2. A large difference is preferably 6, or more preferably 8, or more. Exact values are advantageously selected to achieve the maximum perceptual improvement.

In a preferred block selection criterion, any pixel block having any block-to-block difference with an adjacent block which is greater than the selected threshold is not processed. Alternatively, all blocks can be processed but any block-to-block difference exceeding the selected threshold value is set back to and limited by the threshold value. This latter alternative is advantageous in order to correct blocks with one side bordering actual image structure and another side bordering flat or featureless image regions.

In a further alternative, where all transform coefficients are available from a decoder, blocks with little AC (non-zero frequency) energy (determined, for example, as the sum of the squares of the transform coefficients) are chosen for processing. For example, blocks with no more than 5%, or more preferably no more than 3%, of their energy in the AC terms are selected for processing.

For the blocks selected in processing operation 6 and using the block-to-block pixel differences determined in processing operation 5, processing operation 7 (FIG. 1A) next determines matrices of error correction values which are added to the processed blocks by adder 8 to finally arrive at corrected blocks. The error correction matrices are the same size as the pixel blocks. Corrected images result from processing all pixel blocks in the images. FIG. 3 illustrates processing operation 7 in more detail as having two principal alternatives, preferred operation 7' and alternative operation 7". Generally, according to preferred operation 7', the block-to-block pixel differences are directly converted into an 8×8 (or other size) error correction matrix. According to alternative operation 7", the differences are first converted into a 4×4 intermediate error matrix, which is then smoothly expanded into a final 8×8 error correction matrix by a transform and inverse transform.

In more detail, preferred operation 7' interpolates the error correction matrix elements from the block-to-block pixel differences determined along each edge. This interpolation is done in a dimension independent manner, in that each matrix element has independent, weighted contributions from each determined block-to-block pixel difference, and each determined block-to-block pixel difference contributes independently only to matrix elements in that row or column of that particular pixel difference.

For example, in case of a value representing the average difference of edge-adjacent pixels along an entire edge, the value is interpolated along all rows or columns perpendicular to that edge.

The weights of the pixel differences have chosen a spatial configuration and a selected overall multiplicative weight, FA*FB. The spatial configuration is chosen, limited by constraints, in order to result in a maximum perceptual improvement. One constraint is that the maximum spatial weight occur adjacent to the block edge of that block-to-block difference to be interpolated. Another constraint is that the sum of the weights be zero in order that the average brightness of the pixel block does not change. A final heuristic constraint is that a difference at one edge of a pixel block coupled with another difference of the same size but different sign at the opposite edge (along a row or column) should interpolate to a uniform gradient between the two edges.

Figure 4A:
FIGS. 4A–D illustrate exemplary spatial weighting configurations.
Figure 4B:
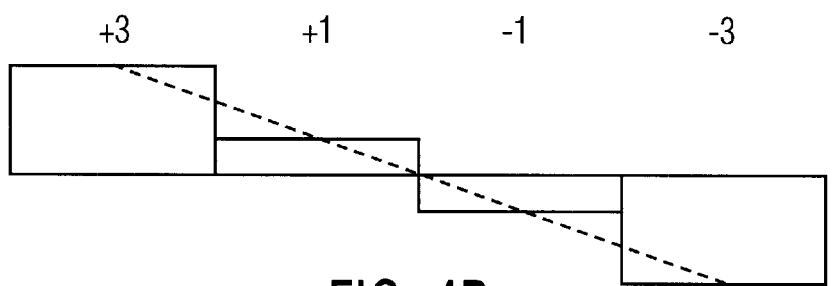
Figure 4C:
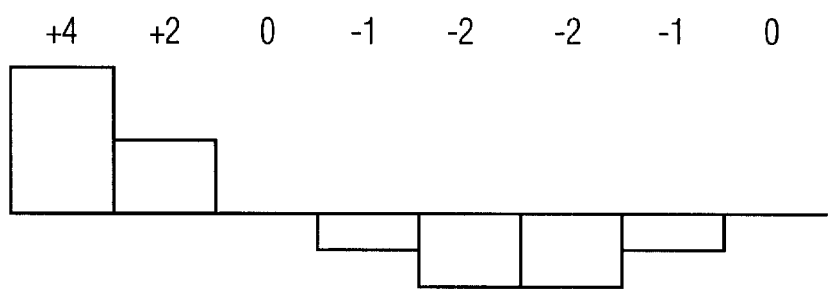
Figure 4D:
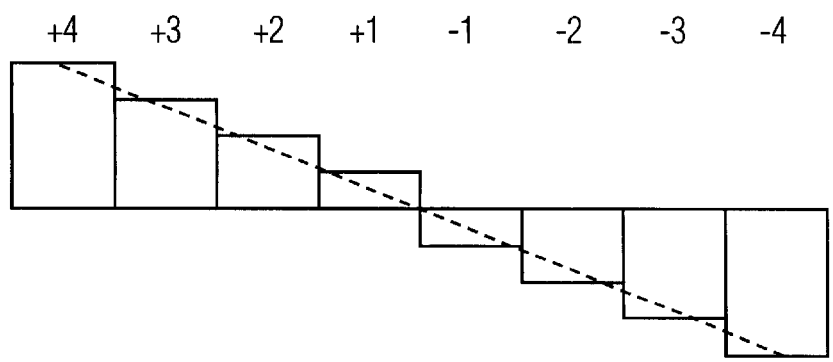

FIG. 4C illustrates the spatial configuration weights for creating the 8×8 error correction matrix of the preferred alternative. The maximum weight occurs next to the interpolated block-to-block pixel difference. The sum of the weights is clearly-zero. Finally, a unit positive pixel difference at a left edge together with a unit negative pixel difference at a right edge is interpolated by the spatial configuration of FIG. 4C into the preferred linear gradient of FIG. 4D. One of average skill will understand how to expand or compress this preferred spatial configuration for other pixel array sizes.

The overall multiplicative factor, FA*FB, is also selected, limited by constraints, in order to result in a maximum perceptual improvement. The overall factor is divided between a weight factor for the block-to-block pixel difference, FA, and a weight factor for the error correction matrix, FB. According to one constraint, the overall factor, FA*FB, is less then or equal 0.500 so that edges between adjacent corrected pixel blocks are not over corrected, that is so that corrected pixel blocks have their block-to-block edge differences reduced without changing the direction of that edge difference. According to another overlapping constraint, the overall factor is less than 0.500 because, in the presence of pixel-value gradients, a certain block-to-block edge difference can be an actual image feature and should not be eliminated. There is also a weighting factor present for normalizing the maximum of the spatial configuration weights to 1.00.

In preferred embodiments, FA is taken as 1.0, so that the block-to-block pixel differences represent unscaled pixel values. Second, FB is advantageously taken as 0.375 as this factor gives good perceptual results and is rapid to compute by shifts and additions without multiplications.

Accordingly, in a preferred embodiment of processing operation 7', the error correction matrix is interpolated from four block-to-block pixel differences, one for each edge of the pixel block to be post-processed, according to the following equations, where FA=1.0 in the determination of the N, E, W, and S differences and FB=0.375*(1.0/4.0). (1/0/4.0 is the spatial configuration weight normalization factor.) The N, E, W, and S input difference values are preferably determined as the average differences of edge-adjacent pixels described above, or alternative as the differ ence in the DC coefficients, also described above. The following equations defining this matrix are exemplary.

$$matrix[0][0] = FB * \{4*N + 4*W\}$$
$$matrix[0][1] = FB * \{4*N - E + 2*W\}$$
$$matrix[0][2] = FB * \{4*N - 2*E\}$$
$$matrix[0][3] = FB * \{4*N - 2*E - W\}$$
$$matrix[0][4] = FB * \{4*N - E - 2*W\}$$
$$matrix[0][5] = FB * \{4*N - 2*W\}$$
$$matrix[0][6] = FB * \{4*N + 2*E - W\}$$
$$matrix[0][7] = FB * \{4*N + 4*E\}$$

$$matrix[1][0] = FB * \{2*N + 4*W - S\}$$
$$matrix[1][1] = FB * \{2*N - E + 2*W - S\}$$
$$matrix[1][2] = FB * \{2*N - 2*E - S\}$$
$$matrix[1][3] = FB * \{2*N - 2*E - W - S\}$$
$$matrix[1][4] = FB * \{2*N - E - 2*W - S\}$$
$$matrix[1][5] = FB * \{2*N - 2*W - S\}$$
$$matrix[1][6] = FB * \{2*N + 2*E - W - S\}$$
$$matrix[1][7] = FB * \{2*N + 4*E - S\}$$

$$matrix[2][0] = FB * \{+4*W - 2*S\}$$
$$matrix[2][1] = FB * \{-E + 2*W - 2*S\}$$
$$matrix[2][2] = FB * \{-2*E - 2*S\}$$
$$matrix[2][3] = FB * \{-2*E - W - 2*S\}$$
$$matrix[2][4] = FB * \{-E - 2*W - 2*S\}$$
$$matrix[2][5] = FB * \{-2*W - 2*S\}$$
$$matrix[2][6] = FB * \{+2*E - W - 2*S\}$$
$$matrix[2][7] = FB * \{+4*E - 2*S\}$$

$$matrix[3][0] = FB * \{-N + 4*W - 2*S\}$$
$$matrix[3][1] = FB * \{-N - E + 2*W - 2*S\}$$
$$matrix[3][2] = FB * \{-N - 2*E - 2*S\}$$
$$matrix[3][3] = FB * \{-N - 2*E - W - 2*S\}$$
$$matrix[3][4] = FB * \{-N - E - 2*W - 2*S\}$$
$$matrix[3][5] = FB * \{-N - 2*W - 2*S\}$$
$$matrix[3][6] = FB * \{-N + 2*E - W - 2*S\}$$
$$matrix[3][7] = FB * \{-N + 4*E - 2*S\}$$

$$matrix[4][0] = FB * \{-2*N + 4*W - S\}$$
$$matrix[4][1] = FB * \{-2*N - E + 2*W - S\}$$
$$matrix[4][2] = FB * \{-2*N - 2*E - S\}$$
$$matrix[4][3] = FB * \{-2*N - 2*E - W - S\}$$
$$matrix[4][4] = FB * \{-2*N - E - 2*W - S\}$$
$$matrix[4][5] = FB * \{-2*N - 2*W - S\}$$
$$matrix[4][6] = FB * \{-2*N + 2*E - W - S\}$$
$$matrix[4][7] = FB * \{-2*N + 4*E - S\}$$

$$matrix[5][0] = FB * \{-2*N + 4*W\}$$
$$matrix[5][1] = FB * \{-2*N - E + 2*W\}$$
$$matrix[5][2] = FB * \{-2*N - 2*E\}$$
$$matrix[5][3] = FB * \{-2*N - 2*E - W\}$$
$$matrix[5][4] = FB * \{-2*N - E - 2*W\}$$
$$matrix[5][5] = FB * \{-2*N - 2*W\}$$
$$matrix[5][6] = FB * \{-2*N + 2*E - W\}$$
$$matrix[5][7] = FB * \{-2*N + 4*E\}$$

$$matrix[6][0] = FB * \{-N + 4*W + 2*S\}$$
$$matrix[6][1] = FB * \{-N - E + 2*W + 2*S\}$$
$$matrix[6][2] = FB * \{-N - 2*E + 2*S\}$$
$$matrix[6][3] = FB * \{-N - 2*E - W + 2*S\}$$
$$matrix[6][4] = FB * \{-N - E - 2*W + 2*S\}$$
$$matrix[6][5] = FB * \{-N - 2*W + 2*S\}$$
$$matrix[6][6] = FB * \{-N + 2*E - W + 2*S\}$$
$$matrix[6][7] = FB * \{-N + 4*E + 2*S\}$$

$$matrix[7][0] = FB * \{+4*W + 4*S\}$$
$$matrix[7][1] = FB * \{-E + 2*W + 4*S\}$$
$$matrix[7][2] = FB * \{-2*E + 4*S\}$$
$$matrix[7][3] = FB * \{-2*E - W + 4*S\}$$
$$matrix[7][4] = FB * \{-E - 2*W + 4*S\}$$
$$matrix[7][5] = FB * \{-2*W + 4*S\}$$
$$matrix[7][6] = FB * \{+2*E - W + 4*S\}$$
$$matrix[7][7] = FB * \{+4*E + 4*S\}$$

The output is the 8×8 error correction matrix.

It will be apparent how to alter these equations where any pixel block edge is associated with more that a single block-to-block pixel difference parameter.

Turning to the alternative embodiment, generally this embodiment determines an error correction matrix which has a size that is smaller than the size of a pixel block and then expands this smaller error correction matrix to the size of the pixel block. The smaller error correction matrix preferably has a size that is a rational fraction of the size of the pixel block, e.g., a 4×4 size when the pixel block size is 8×8. The smaller error correction matrix is preferably expanded in a smooth fashion. For example, this expansion can be done by transforming to a transform domain followed by inverse transforming, with higher frequency coefficients set to zero, from that transform domain to a matrix the size of a pixel block.

In more detail, this alternative embodiment, processing operation 7" of FIG. 3, is illustrated as commencing with operation 20, determination of a 4×4 error matrix. In a preferred embodiment of this alternative method, this 4×4 matrix is determined similarly to the 8×8 matrix discussed above, that is matrix elements are interpolated from the block-to-block pixel differences determined along each edge in a dimension independent manner, such that each matrix element has independent, weighted contributions from each perpendicularly-related block-to-block pixel difference. These pixel differences weights also have a chosen spatial configuration and a selected overall multiplicative weight, FA*FB. The spatial configuration is preferably chosen according to the principles discussed above. FIG. 4A illustrates a preferred spatial weight configuration having elements that sum to zero and which results in a linear gradient between equal but opposite differences at each edge of the 4×4 matrix, as illustrated in FIG. 4B. The multiplicative weights are preferably selected as discussed above. Therefore, it is again preferred that FA=1.0 and FB=0.375. Again, the N, E, W, and S input block-to-block pixel differences are preferably determined as the average differences of edge-adjacent pixels described above, or alternative as the differences in the DC coefficients, also described above.

The following equations are exemplary of this preferred embodiment for defining the 4×4 matrix. FB equals 0.375 multiplied by 1.0/3.0, the spatial configuration normalization factor.

$$matrix[0][0] = FB*\{3*N + 3*W\}$$
$$matrix[0][1] = FB*\{3*N - W - 2*E\}$$
$$matrix[0][2] = FB*\{3*N - 2*W - E\}$$
$$matrix[0][3] = FB*\{3*N + 3*E\}$$

$$matrix[1][0] = FB*\{-N - 2*S + 3*W\}$$
$$matrix[1][1] = FB*\{-N - 2*S - W - 2*E\}$$
$$matrix[1][2] = FB*\{-N - 2*S - 2*W - E\}$$
$$matrix[1][3] = FB*\{-N - 2*S + 3*E\}$$

$$matrix[2][0] = FB*\{-2*N - S + 3*W\}$$
$$matrix[2][1] = FB*\{-2*N - S - W - 2*E\}$$
$$matrix[2][2] = FB*\{-2*N - S - 2*W - E\}$$
$$matrix[2][3] = FB*\{-2*N - S + 3*E\}$$

$$matrix[3][0] = FB*\{+3*S + 3*W\}$$
$$matrix[3][1] = FB*\{+3*S - W - 2*E\}$$
$$matrix[3][2] = FB*\{+3*S - 2*W - E\}$$
$$matrix[3][3] = FB*\{+3*S + 3*E\}$$

In another embodiment, this 4×4 matrix can be determined from pixel sub-edge differences, which reflect finer structure of the block-to-block pixel differences along an edge. Exemplary of such sub-edge differences are the quantities A–L discussed above. In one alternative, these sub-edge difference can be placed around the edges of the 4×4 matrix., one sub-edge difference being placed in the 4×4 matrix at a position corresponding to the position of original pixels in the original 8×8 matrix. The central four matrix elements can be set to zero. The following equations are representative of this alternative, with FB being preferably 0.375.

matrix[0][0]=FB*A; matrix [0][1]=FB*B; matrix [0][2]=FB*C;
matrix[0][3]=FB*D; matrix [1][3]=FB*E; matrix [2][3]=FB*F;
matrix[3][3]=FB*G; matrix [3][2]=FB*H; matrix [3][1]=FB*I;
matrix[3][0]=FB*J; matrix [2][0]=FB*K; matrix [1][0]=FB*L;
matrix[1][1]=matrix[1][2]=matrix[2][1]=matrix[2][2]=0.0

Alternatively, the inner four matrix elements interpolated from the edge elements in a dimension independent manner using the spatial configuration weights of FIG. 4A.

The next processing operations of alternative 7″ expand the 4×4 matrix into an 8×8 matrix in a smooth manner, that is introducing only a minimum of higher spatial frequency components into the final 8×8 matrix. In step 21, the 4×4 matrix is transformed into a 4×4 matrix in a suitable frequency domain. A DCT transform is preferred, but this invention is adaptable to other transforms, such as the computationally inexpensive Hadamard transform. In step 22, the 4×4 frequency domain matrix is embedded in an 8×8 frequency domain matrix with all the remaining elements set to 0. Alternatively, certain elements in the 4×4 matrix, such as the bottom-most row and right-most column, may also be set to zero. Thereby the higher frequency components represented by these matrix elements are zero. Finally, in step 23, the 8×8 frequency domain matrix is inverse transformed into an 8×8 spatial domain error correction matrix, which is used in the subsequent steps of this invention just as the 8×8 matrix of the preferred alternative is used. Preferably, the inverse transform is the same as the forward transform, that is an inverse DCT is used in step 23 if a DCT is used in step 21.

The 8×8 error correction matrix resulting from either the preferred embodiment or the alternative embodiment is then added to the original pixel block to result in a pixel block corrected for blocking artifacts. This process is repeated for all pixel blocks in the image in order to derive a corrected image.

It will be apparent-that, for various classes of images and particular compression methods, the parameters of this method, in particular the block selection threshold and the overall weighting factor values, can be optimized to give maximum perceptual improvement.

Further, the equations presented above are exemplary of one embodiment of the methods described. One of skill in the art will immediately appreciate how their form could be improved for computational efficiency in micro-processors and digital signal processors of various architectures. For example, the total number of arithmetic operations can be reduced by factorization in view of the dimension independence of the 8×8 and 4×4 matrices. Further, multiplicative operations, including the overall multiplicative weight factor, can be implemented by less costly shifts and additions, instead of more costly multiplications.

Additionally, the particular combination of alternatives chosen from those described above can be dictated by a tradeoff of the processing power available in a system with the degree of perceptual improvement sought. This invention is adaptable to a range of degrees of perceptual improvement as increased processing power is available.

It should now be appreciated that the objects of the present invention are satisfied. While the present invention has been described in particular detail, it should also be appreciated that numerous modifications are possible and will be apparent to one of average skill in the art. These modifications are intended to be within the spirit and scope of the invention as claimed.

EXAMPLE

Figure 5:
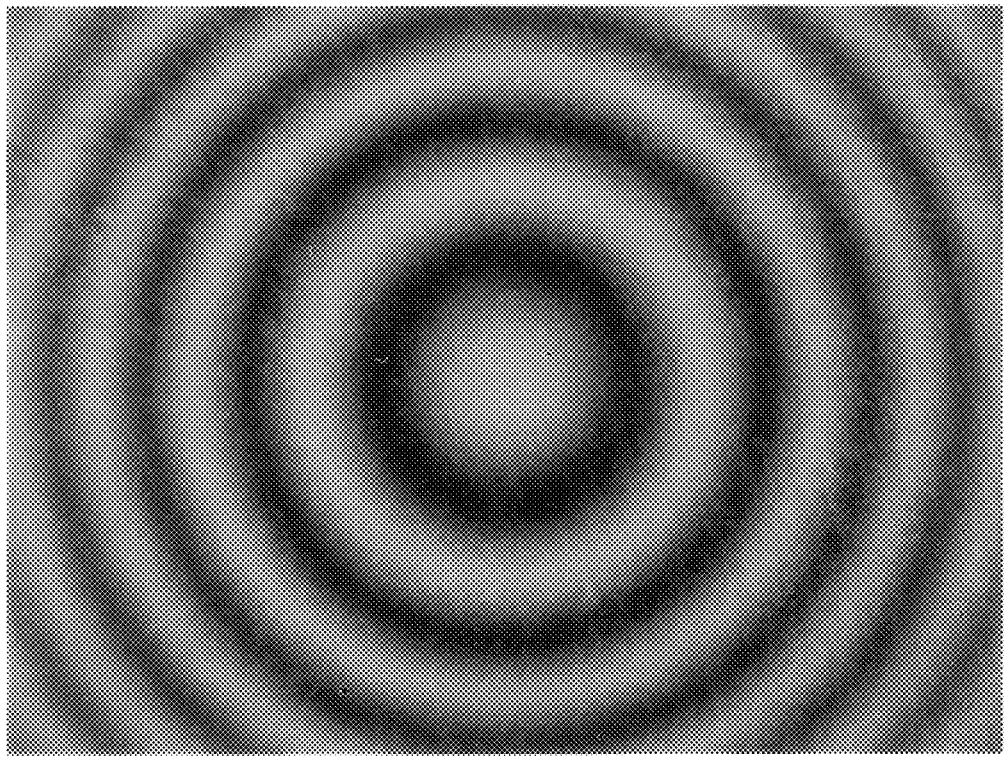
FIG. 5 illustrates a test image.

An example of the functioning of an alternative embodiment of the present invention is described herein. FIG. 5 is a 640×480 test image created by expanding each pixel of a 320×240 monochrome source image to four identical neighboring pixels. The source image has a luminance varying between 64 and 192 in a total range of 0 to 255 according to the following equations.

luminance=128+(64−4R)*cos(4R)

R=(radius in pixel widths/40)$^{1.5}$

Figure 6:
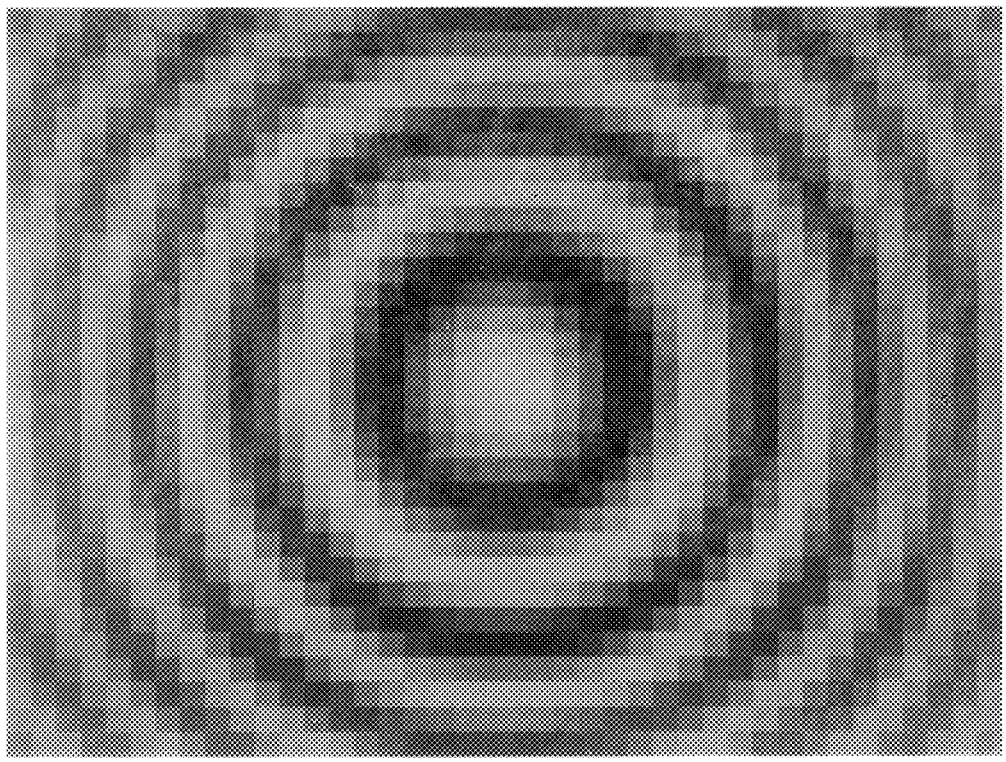
FIG. 6 illustrates the test image of FIG. 5 with a maximum of blocking artifacts.

FIG. 6 is a DCT transform of this image with all DCT coefficients set to zero except for the DC coefficients. It represents a maximally compressed version of FIG. 5 having a maximum of blocking artifacts. Each 8×8 pixel block is clearly apparent.

Figure 7:
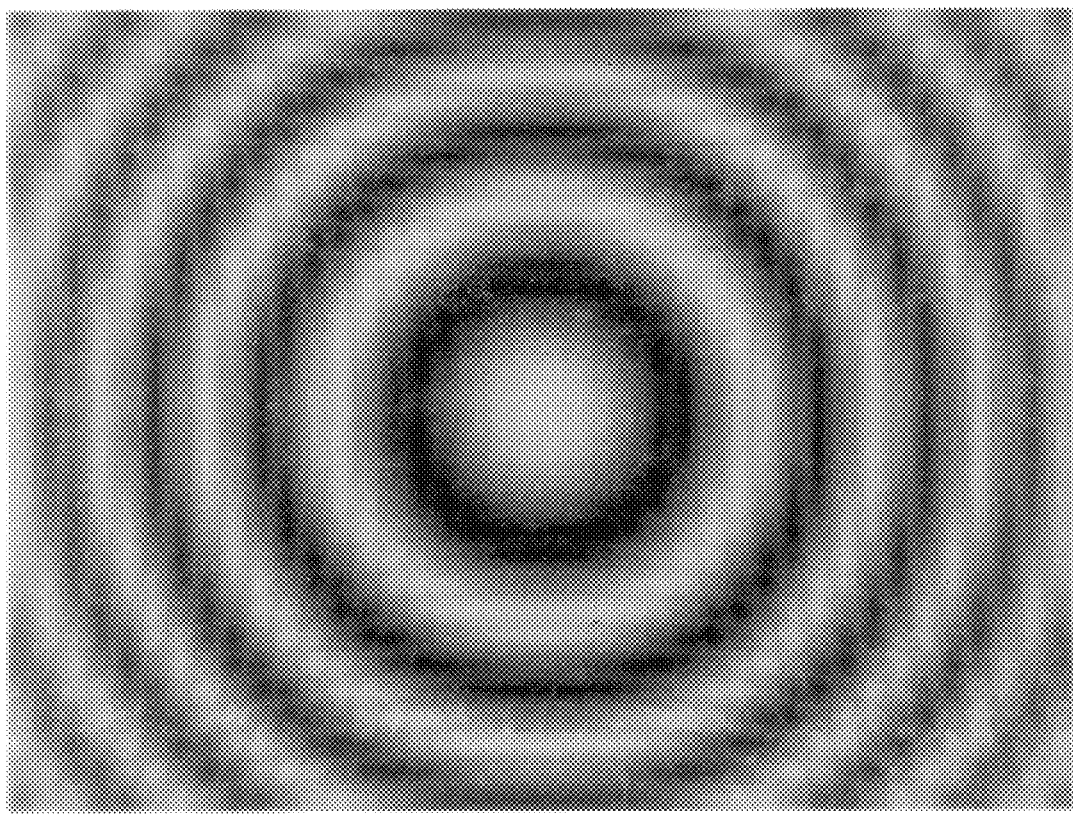
FIG. 7 illustrates the result of post-processing the image of FIG. 6 according to an embodiment of the present invention.

FIG. 7 is a version of FIG. 6 post-processed according to the following early embodiment of the present invention. Sub-edge pixel differences A–L were determined as discussed above, resulting in four block-to-block pixel differences for each edge of each 8×8 pixel block. These coefficients were placed appropriately around the edge of a 4×4 matrix, as described for an alternative embodiment of processing operation 7", and were then Hadamard transformed. The overall weighting factor was 0.125, a very conservative value compared to the preferred value of 0.375. The upper left hand 3×3 sub-matrix (out of the total 4×4 matrix) of Hadamard coefficients, together with the original DC coefficient, were inverse DCT transformed to derive FIG. 7.

FIG. 7 is certainly perceptually much improved, the extreme blocking artifacts being much reduced and even eliminated in the central regions of the image.

The example illustrates the power of the system and method of this invention to achieve substantial reduction in blocking artifacts of image compression algorithms by using only simple and computationally inexpensive processing operations.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A method for post-processing a decompressed image, the image having been compressed by a process including independent compression of non-overlapping rectangular blocks of pixels covering the original image, said method comprising:

determining four or more quantities for each pixel block in the decompressed image that are representative of blocking artifacts, wherein the four or more quantities for a pixel block are determined from block-to-block differences between combinations of values of pixels in that pixel block and combinations of values of pixels in the four pixel blocks orthogonally adjacent to that pixel block, selecting pixel blocks for post-processing according to the four or more quantities for each pixel block and a threshold value, determining an error correction matrix for each selected pixel block from the four or more quantities for that selected pixel block, wherein the error correction matrices have the same size as the pixel blocks, and adding the error correction matrices to the selected pixel blocks to derive post-processed pixel blocks and the post-processed image.

2. The method of claim 1 wherein the four or more quantities for a pixel block are four quantities determined from the four differences between averages of values of pixels along each edge of that pixel block and averages of values of pixels along adjacent edges of the adjacent pixel blocks.

3. The method of claim 1 wherein the four or more quantities for a pixel block are determined from averages of differences between the values of pixels of each of two or more adjacent pairs of pixels, and wherein for each pair of pixels one pixel of that pair is at an edge of that pixel block and the other pixel of that pair is adjacent at an adjacent edge of the adjacent pixel block.

4. The method of claim 1 wherein compression of a pixel block comprises quantizing transform coefficients of the values of pixels of that pixel block.

5. The method of claim 4 wherein the four or more quantities for a pixel block are four quantities determined from the four differences between a zero-frequency (DC) transform coefficient of that pixel block and zero-frequency transform coefficients of the four orthogonally adjacent pixel blocks.

6. The method of claim 4 wherein the threshold value is of the order of magnitude of errors in pixel values introduced by the combined steps of transforming, quantizing, dequantizing, and inverse transforming applied to pixel blocks.

7. The method of claim 1 wherein said selecting selects pixel blocks for which all of the four or more quantities are less than the threshold value.

8. The method of claim 1 wherein said selecting selects all pixel blocks, and wherein the method further comprises setting to the threshold value any of the four or more quantities for each pixel block which are greater than the threshold value.

9. The method of claim 1 wherein each error correction matrix is determined by a process comprising linearly interpolating the four or more quantities according to selected spatial configuration weights in order to determine elements of the error correction matrices.

10. The method of claim 9 wherein said linear interpolation is performed in a dimensionally-independent manner according to which a quantity at an edge is interpolated similarly to all error correction matrix elements that are in either a row or a column perpendicular to that edge.

11. The method of claim 9 wherein the spatial configuration weights are selected such that (i) the largest weight is applied at the edge associated with the quantity to be interpolated, (ii) the sum of the spatial configuration weights is zero, and (iii) the interpolation of equal quantities of opposite sign at two opposite edges result in a linear gradient of error correction matrix elements between the two opposite edges.

12. The method of claim 11 wherein the pixel blocks have size 8×8 pixels, and wherein the spatial configuration weights have relative values +4, +2, 0, −1, −2, −2, −1, and 0.

13. The method of claim 1 wherein said determining an error correction matrix comprises:

determining an intermediary error correction matrix having a size smaller than the size of the pixel blocks by linearly interpolating the four or more quantities in a dimensionally independent manner according to selected spatial configuration weights, transforming the intermediary error correction matrix to a transform domain, and inverse transforming the transformed intermediary error correction matrix to the error correction matrix, wherein for said inverse transformation selected higher order transform coefficients are set to zero.

14. The method of claim 13 wherein the pixel blocks are square of size 8×8 pixels, and wherein the intermediary error correction matrices are square of size 4×4 pixels.

15. The method of claim 1 wherein the error correction matrix is determined so that block-to-block pixel differences between two adjacent post-processed pixel blocks are smaller than but of the same sign as the block-to-block pixel differences between those two adjacent pixel blocks prior to post-processing.

16. A computer readable media encoded with program instructions for causing one or more processors to perform the method of claim 1.

17. A system for post-processing a decompressed image, the image having been compressed by a process including independent compression of non-overlapping rectangular blocks of pixels covering the original image, said system comprising:
- means for determining four or more quantities for each pixel block in the decompressed image that are representative of blocking artifacts, wherein the four or more quantities for a pixel block are determined from block-to-block differences between combinations of values of pixels in that pixel block and combinations of values of pixels in the four pixel blocks orthogonally adjacent to that pixel block,
- means for selecting pixel blocks for post-processing according to the four or more quantities for each pixel block and a threshold value,
- means for determining an error correction matrix for each selected pixel block from the four or more quantities for that selected pixel block, wherein the error correction matrices have the same size as the pixel blocks, and
- means for adding the error correction matrices to the selected pixel blocks to derive post-processed pixel blocks and the post-processed image.

18. The system of claim 17 wherein the four or more quantities for a pixel block are four quantities determined from the four differences between averages of values of pixels along each edge of that pixel block and averages of values of pixels along adjacent edges of the adjacent pixel blocks.

19. A system for post-processing a decompressed image, the image having been compressed by a process including independent compression of non-overlapping rectangular blocks of pixels covering the original image, said system comprising:
- one or more processors for executing program instructions, and
- one or more memory units for storing an image to be processed and program instructions, wherein the program instructions cause said one or more processors
  - to determine four or more quantities for each pixel block in the decompressed image that are representative of blocking artifacts, wherein the four or more quantities for a pixel block are determined from block-to-block differences between combinations of values of pixels in that pixel block and combinations of values of pixels in the four pixel blocks orthogonally adjacent to that pixel block,
  - to select pixel blocks for post-processing according to the four or more quantities for each pixel block and a threshold value,
  - to determine an error correction matrix for each selected pixel block from the four or more quantities for that selected pixel block, wherein the error correction matrices have the same size as the pixel blocks, and
  - to add the error correction matrices to the selected pixel blocks to derive post-processed pixel blocks and the post-processed image.

20. The system of claim 19 wherein the four or more quantities for a pixel block are four quantities determined from the four differences between averages of values of pixels along each edge of that pixel block and averages of values of pixels along adjacent edges of the adjacent pixel blocks.

* * * * *